US009660791B2

(12) United States Patent
Kim et al.

(10) Patent No.: US 9,660,791 B2
(45) Date of Patent: May 23, 2017

(54) APPARATUS AND METHOD FOR DISCONTINUOUS RECEPTION IN MOBILE TELECOMMUNICATION SYSTEM

(75) Inventors: Soeng-Hun Kim, Suwon-si (KR); Gert Jan Van Lieshout, Staines (GB); Ju-Ho Lee, Suwon-si (KR); Youn-Hyoung Heo, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 595 days.

(21) Appl. No.: 12/143,025

(22) Filed: Jun. 20, 2008

(65) Prior Publication Data
US 2009/0010173 A1    Jan. 8, 2009

(30) Foreign Application Priority Data

Jun. 20, 2007 (KR) ................................ 2007-60810
Aug. 30, 2007 (KR) ........................ 10-2007-0087644

(51) Int. Cl.
H04L 5/00 (2006.01)
H04W 52/02 (2009.01)

(52) U.S. Cl.
CPC ....... *H04L 5/0091* (2013.01); *H04W 52/0216* (2013.01); *H04W 52/0248* (2013.01)

(58) Field of Classification Search
CPC . H04W 52/02; H04W 28/04; H04W 52/0248; H04L 5/0091
USPC ........................................................ 370/252
See application file for complete search history.

(56) References Cited

U.S. PATENT DOCUMENTS

| 7,230,932 | B2 | 6/2007 | Numminen | |
|---|---|---|---|---|
| 7,688,176 | B2 * | 3/2010 | Jang | ..................... H04L 1/0025 337/311 |
| 2005/0159162 | A1 * | 7/2005 | Park | ............................. 455/450 |
| 2007/0133479 | A1 * | 6/2007 | Montojo et al. | .............. 370/335 |
| 2007/0177569 | A1 * | 8/2007 | Lundby | ......................... 370/349 |
| 2008/0056229 | A1 * | 3/2008 | Gholmieh et al. | ............ 370/349 |
| 2008/0101280 | A1 * | 5/2008 | Gholmieh | ............. H04L 1/0026 370/328 |
| 2008/0186893 | A1 * | 8/2008 | Kolding et al. | .............. 370/311 |
| 2013/0301583 | A1 | 11/2013 | Lundby | |

FOREIGN PATENT DOCUMENTS

EP           1 499 144      3/2004
WO     WO 2007/053840      5/2007

OTHER PUBLICATIONS

WG2#56—3GPP TSGRAN—Nov. 6-10, 2006. LG Electronics. DRX Scheme.*

(Continued)

*Primary Examiner* — Stephen J Clawson
(74) *Attorney, Agent, or Firm* — The Farrell Law Firm, P.C.

(57) ABSTRACT

A communication apparatus and method for performing discontinuous reception in a mobile communication system is provided. The communication apparatus continues to turn on a receiver during a reception-on (Rx-on) period associated with persistent resource allocation to receives a packet, and receives a retransmission packet transmitted through the persistent resources at the Rx-on period spaced from the Rx-on period by a processing time of the retransmission packet given taking into account feedback information determined according to a reception error of the packet.

12 Claims, 14 Drawing Sheets

(56) References Cited

OTHER PUBLICATIONS

Suckchel Yang et al. "Adaptive Discontinuous Reception Mechanism for Power Saving in UMTS", IEEE Communication Letters, vol. 11, Issue 1, pp. 40-42, Jan. 2007.
European Search Report dated Dec. 18, 2014 issued in counterpart application No. 08766495.9-1852.
Ericsson, "DRX Control for LTE_Active and VoIP", R2-071818, 3GPP TSG-RAN WG2 Meeting #58, May 7-11, 2007.
Alcatel-Lucent, "Persistent DL Scheduling and VoIP", R2-071368, 3GPP TSG RAN WG2 #57bis, Mar. 26-30, 2007.

* cited by examiner

APPARATUS AND METHOD FOR DISCONTINUOUS RECEPTION IN MOBILE TELECOMMUNICATION SYSTEM

CLAIM OF PRIORITY

This application claims priority to an application entitled APPARATUS AND METHOD FOR DISCONTINUOUS RECEPTION IN MOBILE TELECOMMUNICATION SYSTEM filed in the Korean Industrial Property Office on Jun. 20, 2007 assigned Serial No. 2007-60810, and Aug. 30, 2007 and assigned Serial No. 2007-87644, the contents of which are hereby incorporated by references.

BACKGROUND OF THE INVENTION

Field of the Invention

The present invention relates generally to a mobile communication system, and in particular, to a communication apparatus and method for minimizing power consumption by performing a discontinuous reception operation in a mobile communication system.

Description of the Related Art

In general, the mobile communication system employs a discontinuous reception operation as one of the methods for extending a battery life by minimizing power consumption of a terminal. In this case, it is general that the terminal is a terminal in the idle state, i.e., in the state where there is no radio connection for a particular service. The idle-state terminal is characterized in that it checks the presence/absence of a call at a discontinuous reception time, and transitions to reception-on (Rx-on) or reception-off (Rx-off) according to the check result.

As stated above, the terms frequently used in the discontinuous reception operation includes 'Rx-on' and 'Rx-off', and a brief description thereof will be given below.

Rx-on: It is a state in which a receiver of a terminal is turned on. During the Rx-on period, the terminal performs a normal reception operation. For example, the terminal monitors a control channel during the Rx-on period to detect the presence/absence of its scheduling, and receives downlink data upon detecting the scheduling.

Rx-off: It is a state in which a receiver of a terminal is turned off. Therefore, the terminal minimizes its power consumption through the Rx-off period. That is, during the Rx-off period, the terminal does not monitor the control channel, and during this period, the terminal cannot receive data.

Generally, in the discontinuous reception operation, the idle-state terminal optimizes a length of the Rx-on period and Rx-off period, thereby minimizing the period for which it unnecessarily operates in the Rx-on state. That is, the discontinuous reception operation prevents the terminal from unnecessarily turning on its receiver, thereby minimizing its entire battery power consumption.

However, in the next generation mobile communication system where various types of services are supported, there is a high possibility that the terminal will be not the above-stated idle-state terminal, but a connected-state terminal that should maintain the connected state for a long time. The connected-state terminal, or the terminal having a radio connection, will perform a different discontinuous reception operation from that of the above-stated idle-state terminal. Accordingly, there is a need to make a discussion on the scenario of a discontinuous reception operation for minimizing power consumption of the connected-state terminal.

This means the need for a detailed discontinuous reception operation of a terminal for supporting various services in the next generation mobile communication system.

SUMMARY OF THE INVENTION

Accordingly, an aspect of the present invention is to provide a communication apparatus and method for performing a discontinuous reception operation in a mobile communication system supporting various services.

Another aspect of the present invention is to provide a connected-state communication apparatus for performing a discontinuous reception operation in a mobile communication system, and a discontinuous reception method of the communication apparatus.

Further another aspect of the present invention is to provide a communication apparatus for supporting a specific-size packet service at stated intervals in a mobile communication system, and a discontinuous reception method of the communication apparatus.

Yet another aspect of the present invention is to provide a discontinuous reception method for setting different Rx-on periods taking into account a characteristic of a packet corresponding to a particular service, and a communication apparatus for performing a discontinuous reception operation according to the method.

According to one aspect of the present invention, there is provided a method for perform discontinuous reception in a mobile communication system. The method includes receiving a packet transmitted through persistent resources for a first reception-on (Rx-on) period being set according to the persistent resources; checking a reception error of the packet, and transmitting feedback information to a scheduling device; and receiving retransmission packet transmitted through the persistent resources for a second Rx-on period being spaced from an end time of the first Rx-on period by a processing time interval of the packet retransmitted according to the feedback information.

According to another aspect of the present invention, there is provided a communication apparatus for performing discontinuous reception in a mobile communication system. The apparatus includes a discontinuous reception controller for calculating a first reception-on (Rx-on) period being set according to persistent resources, turning on a receiver for the first Rx-on period, and turning on the receiver for a second Rx-on period being spaced from an end time of the first Rx-on period by a processing time interval of a packet retransmitted according to feedback information determined by a reception error of the packet transmitted through the persistent resources; and a transceiver for turning on the receiver under control of the discontinuous reception controller, to receive a packet or retransmission packet transmitted through the persistent resources.

Effect of the Invention

As is apparent from the following description, the present invention provides Rx-on periods optimized taking into account the packets for a particular service, periodically generated in the next generation mobile communication system supporting various services. In addition, the present invention provides Rx-on periods optimized separately for persistent resources and temporarily allocated resources. Further, the present invention provides Rx-on periods optimized at the same transmission time taking into account the periodically generated packets and the persistent resources.

Therefore, the present invention can dynamically set discontinuous reception periods of the communication apparatus supporting various services, minimizing the power consumption.

DETAILED DESCRIPTION OF PREFERRED EMBODIMENTS

Preferred embodiments of the present invention will now be described in detail with reference to the annexed drawings. In the following description, a detailed description of known functions and configurations incorporated herein has been omitted for clarity and conciseness. Terms used herein are defined based on functions in the present invention and may vary according to users, operators' intention or usual practices. Therefore, the definition of the terms should be made based on contents throughout the specification.

The present invention provides a scheme by which a connected-state communication apparatus minimizes power consumption in the next generation mobile communication system supporting various services.

In the present invention, the communication apparatus includes all electronic communication apparatuses which can perform communication while on the move, such as terminal, portable telephone, Personal Digital Assistants (PDA) and portable computer, and for convenience' sake, they will be referred to herein as a 'terminal'.

In $3^{rd}$ Generation Partnership Project (3GPP) which is a standard group in charge of $3^{rd}$ generation standard, standardization of the next generation mobile communication system for supporting various services is now in progress, and in particular, standardization work on the Long Term Evolution (LTE) system evolved from the Universal Mobile Telecommunication Service (UMTS) system is under discussion. Although a description of the present invention will be given herein with reference to the LTE system which is the next generation mobile communication system based on the UMTS system, by way of example, the present invention can be applied even to other next generation mobile communication systems to which a device (base station-based scheduling device) for gathering status information of multiple User Equipments (UEs) and performing scheduling depending thereon is applied, with a modification.

Meanwhile, the service expected to be most popularly used in the LTE system can include a Voice over Internet protocol (VoIP) service supporting a voice service based on Internet protocol. Therefore, the present invention proposes how to apply a discontinuous reception operation for minimizing power consumption of a terminal supporting the VoIP service.

Figure 1:
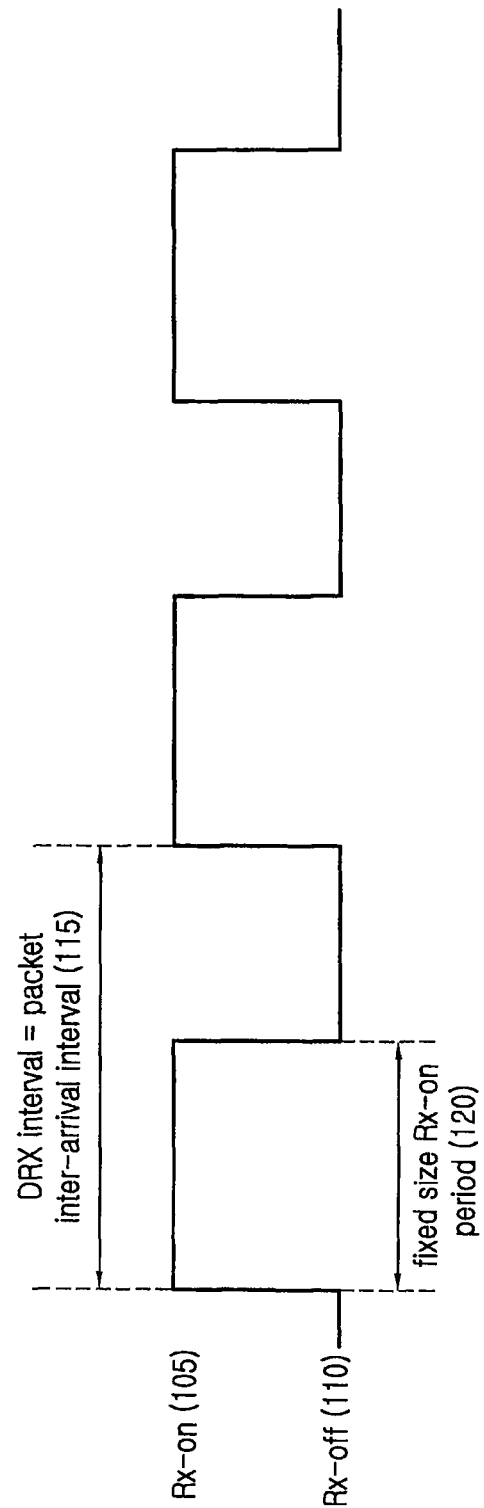
FIG. 1 is a diagram for a description of a discontinuous reception operation to which the present invention is applied.

FIG. 1 is a diagram for a brief description of a discontinuous reception operation to which the present invention is applied.

Referring to FIG. 1, a terminal has a discontinuous reception interval (DRX interval or packet inter-arrival interval) 115 which is set according to a packet generation period, and maintains its Rx-on state 105 for a predetermined period (fixed size Rx-on period) 120 to receives a VoIP packet. Thereafter, the terminal transitions to an Rx-off state 110 if the predetermined period 120 expires.

Although the discontinuous reception operation of transitioning to the Rx-on or Rx-off state according to the packet is simple here, it is hard to consider that the discontinuous reception operation sufficiently reduces the power consumption in reality, given the consecutive packets by the VoIP service, i.e., VoIP traffics, and the reason is as follows. Since the terminal according to the present invention maintains the Rx-on state 105 for a relatively long period in preparation for reception of VoIP packets even during a silent period where no VoIP packet is generated, the terminal cannot actually achieve its purpose of minimizing power consumption during the silent period.

Therefore, the present invention proposes a discontinuous reception method and apparatus for minimizing power consumption of a terminal which is receiving a service in which packets are generated at regular intervals, like the VoIP service. In particular, the present invention proposes a discontinuous reception operation having the following characteristics.

Characteristic 1

The present invention proposes a scheme for performing a discontinuous reception operation of dividing the state of a VoIP session into a talk spurt period and a silent period and providing an Rx-on period optimized taking the session state into account.

Characteristic 2

The present invention proposes a scheme for performing a discontinuous reception operation by distinguishing persistent resources from temporary resources. The persistent resources mean the resources previously allocated for VoIP packets.

Characteristic 3

The present invention proposes a discontinuous reception operation of efficiently receiving traffics of consecutive packets which are generated temporarily, or intermittently, during the discontinuous reception operation.

In the present invention, the Rx-on period is defined in the following three types.

1. First Rx-on period (type Rx-on period): It is an Rx-on period applied in common to the silent period and talk spurt period, and is activated at regular intervals regardless of receipt of packets.

2. Second Rx-on period (type 2 Rx-on period): It is an Rx-on period which is activated when packets are received through persistent resources.

3. Third Rx-on period (type 3 Rx-on period): It is an Rx-on period which is activated when packets are received through temporary resources.

Figure 2:
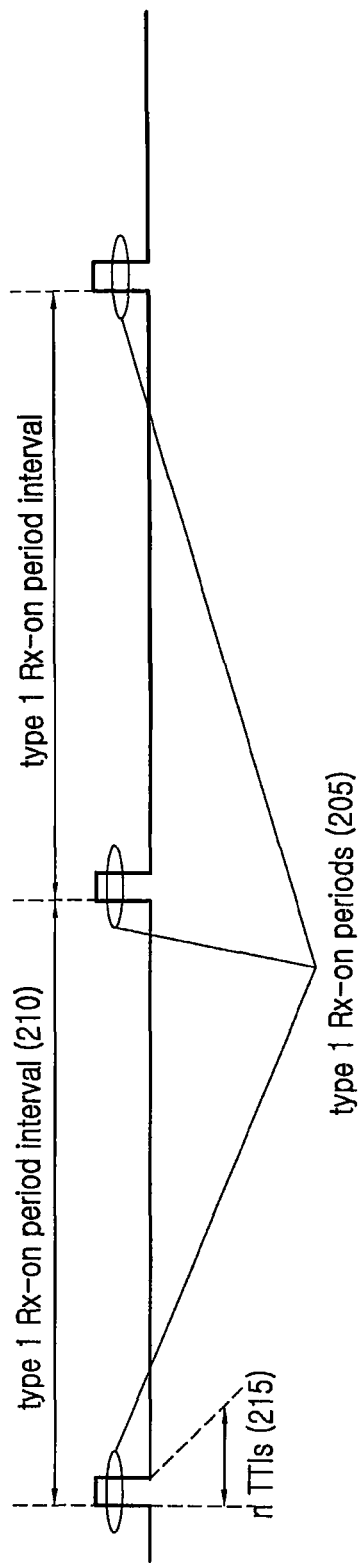
FIG. 2 is a diagram for a description of a first Rx-on period according to an embodiment of the present invention.

FIG. 2 is a diagram for a description of the first Rx-on period according to an embodiment of the present invention.

A terminal has an interval determined in a call setup process, i.e., first Rx-on period interval (type 1 Rx-on period interval) 210, and transitions to the Rx-on state at a first Rx-on period 205. In particular, the first Rx-on period interval 210 can be set to the same value as, for example, a generation period of a VoIP packet. According to the discussion made up to now, VoIP packets in the talk spurt period are generally expected to be generated in a relatively constant size every 20 msec, and VoIP packets in the silent period are generally expected to be generated every 160 msec.

As illustrated in FIG. 2, if a length of the first Rx-on period 205 is set to n Transmission Time Intervals (TTIs) in a call setup process, the terminal monitors a control channel for n TTIs 215 at a start time of the first Rx-on period. The control channel is a channel for transmitting scheduling information and the like. Here, n can be an integer, including 1. The TTI is the basic transmission time interval which is a unit of packet transmission/reception in the LTE system, and it is now defined as 1 msec.

Figure 3:
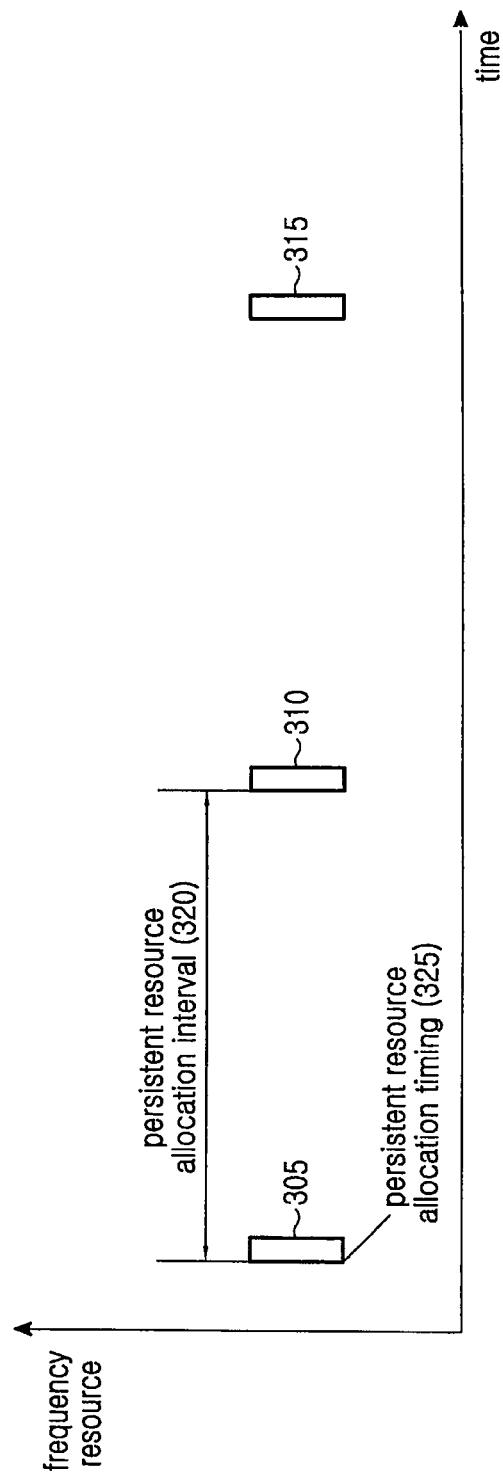
FIG. 3 is a diagram for a description of persistent resources to which the present invention is applied.

FIG. 3 is a diagram for a description of the persistent resources to which the present invention is applied.

The term 'persistent resources' as used herein refers to periodic resources previously allocated from an upper layer to allow the terminal to transmit/receive the periodically generated packets such as the VoIP service. The time the persistent resources are allocated is defined herein as persistent resource allocation timing 325, and the interval where the persistent resources are allocated is referred to as a persistent resource allocation interval 320.

In other words, the term 'persistent resources' refers to resources 305, 310 and 315, which are automatically granted to the terminal every persistent resource allocation timing 325. The persistent resources 305, 310 and 315 are used only for HARQ initial transmission, and HARQ retransmission can be achieved through the general resources.

Figure 4:
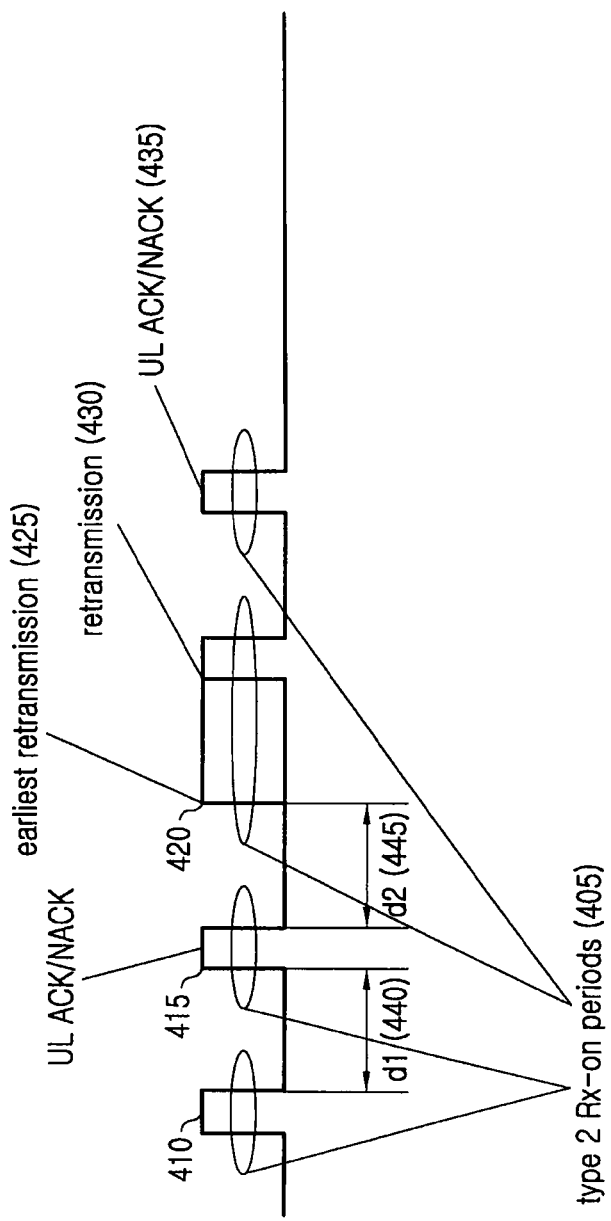
FIG. 4 is a diagram for a description of a second Rx-on period according to an embodiment of the present invention.

FIG. 4 is a diagram for a description of the second Rx-on period according to an embodiment of the present invention.

In the present invention, a second Rx-on period 405 is defined as a set of periods where the terminal should turn on its transceiver with regard to the packets it should receive through the persistent resources. That is, the second Rx-on period 405 includes all periods where the terminal should turn on its transceiver to process the packets it receives through downlink persistent resources.

Therefore, the second Rx-on period 405 includes TTI 410 where persistent resources are allocated, and TTI 420 where there is a possibility that the packet transmitted through persistent resources will be retransmitted. The second Rx-on period 405 further includes TTIs 415 and 435 associated with transmission of HARQ feedback information for the downlink packet. Regarding the second Rx-on period 405, when persistent resources are allocated in the uplink, TTI where uplink persistent resources are allocated, and TTI associated with reception of transmitted HARQ feedback for the uplink packet are also included in the second Rx-on period 405.

Meanwhile, the general resources other than the persistent resources will be referred to herein as 'temporary resources'.

Referring to FIG. 4, the terminal transitions to the Rx-on state in the TTI 410 where persistent resources are allocated, and receives the downlink packet transmitted through the persistent resources. Further, the terminal performs Cyclic Redundancy Check (CRC) calculation on the received packet, and determines occurrence/non-occurrence of an error in the received packet according to the calculation result. The Rx-on period which is activated in the TTI where persistent resources are allocated will be referred to herein as an 'Rx-on period associated with a persistent resource allocation interval'.

Regarding the error in the received downlink packet, the terminal transmits HARQ feedback information. The HARQ feedback information can be transmitted through an uplink channel after a lapse of a predetermined time d1 440 from the TTI 410 where persistent resources are allocated. The time d1 440 is a predetermined value, and this value is recognized in common by the terminal and base station before they perform communication. The expression 'the terminal transmits uplink HARQ feedback information' herein means the need to turn on its transmitter. In this case, terminal's turning on only the transmitter and turning off the receiver has no significant difference in terms of the actual power consumption (saving).

In other words, even though the terminal turns on only its transmitter and turns off its receiver, since it has no gain in terms of the actual power, the terminal according to the present invention further includes turning on the receiver as well while transmitting uplink feedback information, to thereby monitor a downlink control channel. The period where the terminal turns on its receiver while the uplink feedback information is transmitted will be referred to herein as an 'Rx-on period associated with uplink feedback transmission'.

Figure 5:
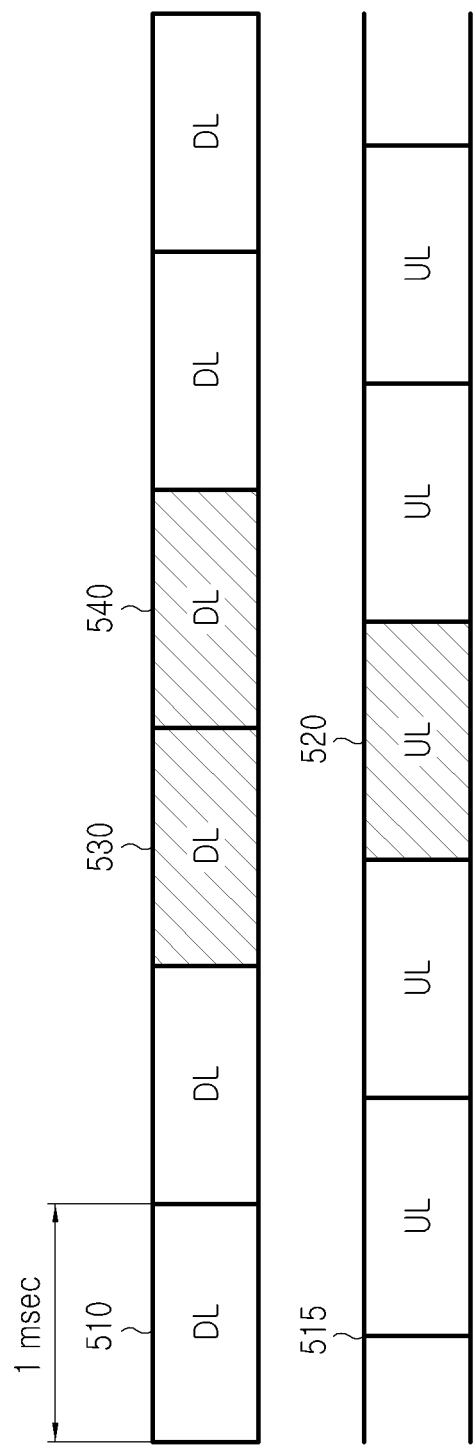
FIG. 5 is a diagram illustrating a timing relationship between uplink feedback information transmission and downlink control information reception according to an embodiment of the present invention.

With reference to FIG. 5, a description will now be made of timing relationship between uplink feedback information transmission and downlink control information reception according to an embodiment of the present invention.

Referring to FIG. 5, in the asynchronous system, the downlink 510 and the uplink 520 are not coincident in terms of their frame boundary. Therefore, the uplink TTI where the terminal transmits feedback information may exist over more than one downlink TTL. Thus, the Rx-on period associated with uplink feedback information transmission in the second Rx-on period stated in FIG. 4 can be (i) the nearest TTI 530 starting at the time earlier than the TTI 520 where the uplink feedback information is transmitted, (ii) the nearest TTI 540 starting at the time later than the TTI 520 where the uplink feedback information is transmitted, or (iii) both of the two TTis 530 and 540.

If there is HARQ retransmission 425 for the packet transmitted through persistent resources, specifically, if HARQ NACK is transmitted from the terminal, the base station performs HARQ retransmission on the packet corresponding to the HARQ NACK. In this case, the HARQ retransmission occurs after the earliest TTI 425 where the retransmission can happen. The earliest TTI 425 where the HARQ retransmission can happen is the time that has elapsed by a predetermined time d2 445 from the time the transmission of the HARQ NACK was completed, and the time d2 445 is also a predetermined value that the terminal and the base station recognize in common before performing communication.

The terminal maintains its Rx-on state for the TTI 430 where the HARQ retransmission is actually implemented, beginning from the earliest TTI 425 where the HARQ retransmission can happen. Herein, the terminal not only wakes up at the TTI where the HARQ retransmission is implemented, but also keeps its Rx-on state until the retransmission happens, beginning from the earliest TTI where the HARQ retransmission can happen. The period for which the receiver keeps its Rx-on state for the HARQ retransmission will be referred to herein as an 'Rx-on period associated with HARQ retransmission'.

Therefore, the second Rx-on periods can be subdivided into the second Rx-on period 410 associated with the persistent resource allocation interval, the second Rx-on period 415 associated with the uplink feedback transmission, and the second Rx-on periods 420 and 430 associated with the HARQ retransmission.

In addition, according to the present invention, the terminal monitors a downlink control channel for the corresponding TTI, recognizing the downlink TTI overlapping with the uplink persistent resource allocation interval as an 'second Rx-on period associated with the uplink persistent resource allocation interval'. In addition, the terminal monitors a downlink control channel for the corresponding period, recognizing the period where it receives an HARQ feedback for the packet transmitted through the uplink persistent resources, as a 'second Rx-on period associated with the downlink feedback reception'.

In the next generation mobile communication system, since simultaneously providing several services to one terminal is no longer a rare occasion, even though persistent resources are allocated to the terminal supporting a particular service such as VoIP, there is a possible need to transmit to the terminal the data generated in another service. Accordingly, the base station allocates new resources to the terminal through a control channel in the first Rx-on period or the second Rx-on period, and schedules the terminal to support the new service.

For example, the terminal, which was allocated temporary resources corresponding to a particular service being different from the persistent resources in the first Rx-on period or the second Rx-on period, should keep its Rx-on state until the packet reception through the temporary resources is completed. Such an Rx-on period is called herein a third Rx-on period. The expression 'the temporary resources being different from the persistent resources' as used herein means that the temporary resources are not the temporary resources allocated for HARQ retransmission for the packet initial-transmitted through the persistent resources.

Figure 6:
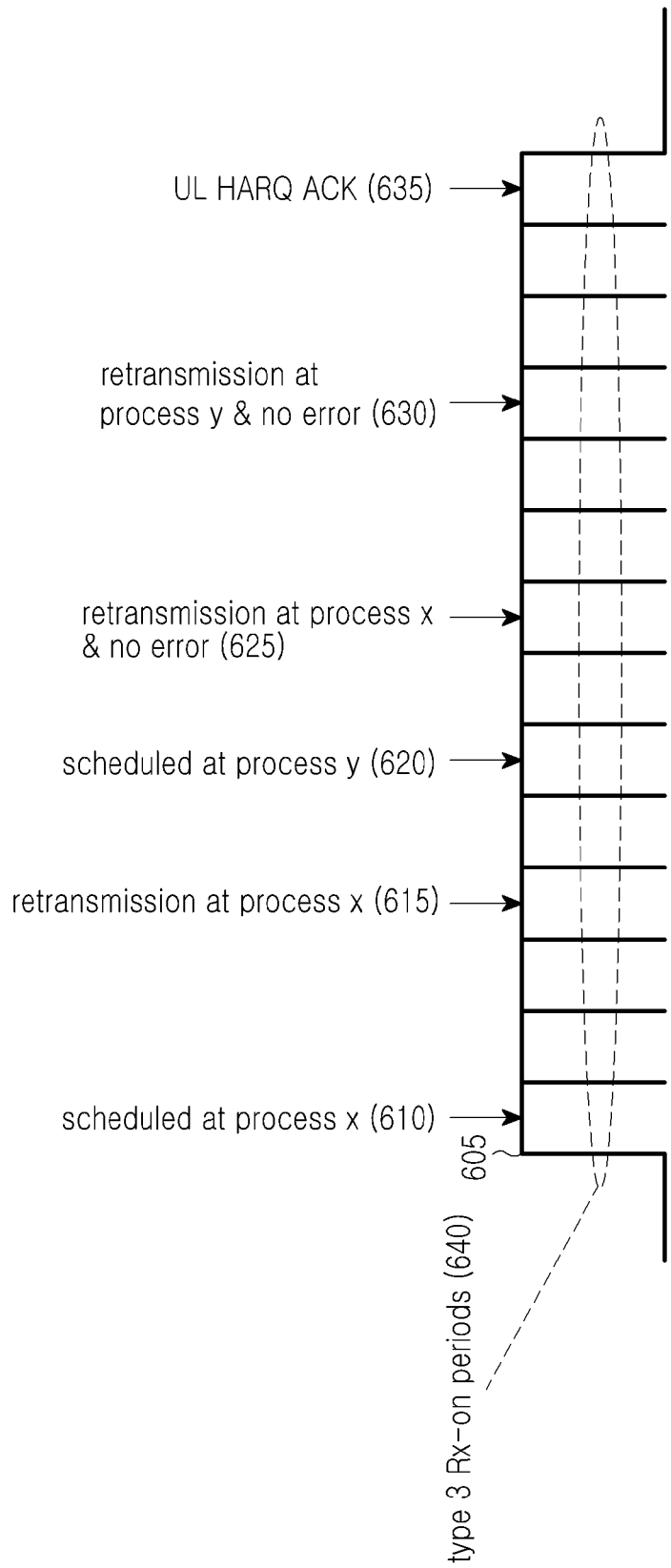
FIG. 6 is a diagram for a description of a third Rx-on period according to an embodiment of the present invention.

FIG. 6 is a diagram for a description of a third Rx-on period according to an embodiment of the present invention.

Referring to FIG. 6, a third Rx-on period (type 3 Rx-on period) 640 is an Rx-on period which is activated to receive a packet through temporary resources. The third Rx-on period expires when the processing on the packet received through the temporary resources is completed.

For example, when temporary resources are allocated in the TTI 605 corresponding to the first Rx-on period or second Rx-on period, the third Rx-on period starts. For instance, assuming that the packet transmitted through the temporary resources is processed at an HARQ processor x, if another packet is received through the temporary resources before the reception of the packet being processed at the HARQ processor x is completed, the third Rx-on period is extended until the reception of the packets is completed.

Therefore, if a new HARQ packet is received at an HARQ processor y through the temporary resources (620) in the state where the process on the HARQ packet being processing at the HARQ processor x is not completed, the third Rx-on period lasts until the processing on the HARQ packet at the HARQ processor x and the HARQ packet at the HARQ processor y is completed. That is, if the reception of the HARQ packet being processed at the HARQ processor x is completed at TTI 625 and the reception of the HARQ packet being processed at the HARQ processor y is completed at TTI 635, the terminal ends the third Rx-on period.

That is, the third Rx-on period expires at the time the processing on all the HARQ packets received through the temporary resources is completed. The time that the reception of the HARQ packets is completed includes the time the transmission of the corresponding feedback information is completed, when the packet reception is failed even though retransmission on the HARQ packets has been performed a predetermined number of times according to the HARQ operation, or when the packet reception is made successfully before the retransmission is performed the predetermined number of times.

Figure 7:
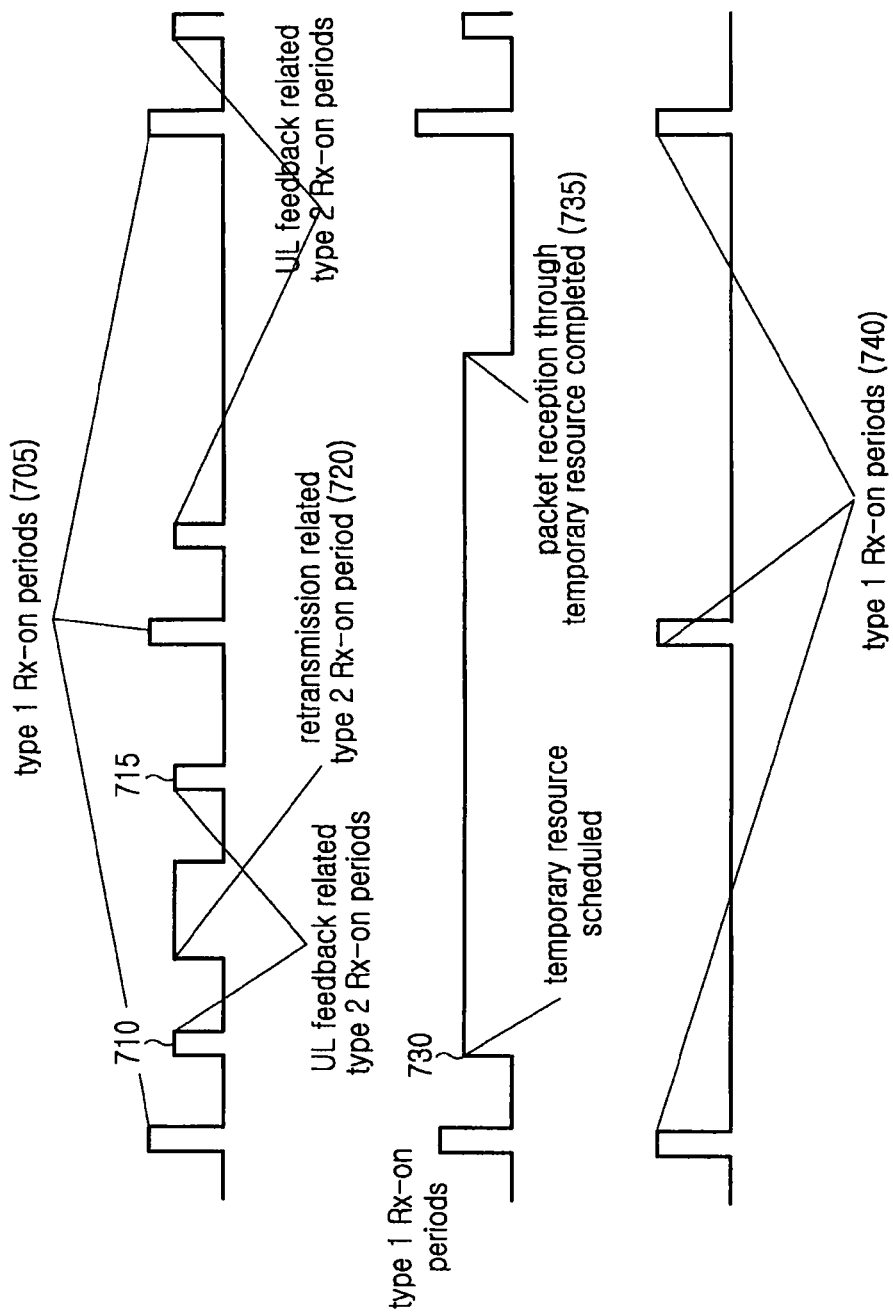
FIG. 7 is a diagram for a description of a terminal's discontinuous reception operation based on first through third Rx-on periods according to a first embodiment of the present invention.

FIG. 7 is a diagram for a description of a discontinuous reception operation according to the first embodiment of the present invention.

Referring to FIG. 7, a terminal is operating in a talk spurt period with regard to the VoIP service. That is, the terminal is allocated persistent resources according to a VoIP packet generation period. Therefore, in the discontinuous reception operation of the terminal, it is most efficient that the first Rx-on period based on the talk spurt period and the second Rx-on period based on the persistent resource allocation are set according to the packet generation period.

For example, in FIG. 7, the first Rx-on periods 705 of the terminal allocated persistent resources for the talk spurt period are activated at the same TTI as that of the second Rx-on period associated with the persistent resource allocation interval. Upon receiving a packet through persistent resources for the first Rx-on period, the terminal calculates CRC of the packet to check the occurrence/non-occurrence of an error.

Based on the error check result, the terminal transmits HARQ ACK/HARQ NACK, i.e., HARQ feedback information, in the second Rx-on period 710. If the terminal feedback-transmitted the HARQ NACK, it activates the second Rx-on period 720 with respect to the HARQ retransmission after a lapse of a time d2. At this time, if the terminal normally receives the HARQ-retransmitted packet, the second Rx-on period associated with the HARQ retransmission expires, and the second Rx-on period 715 associated with the feedback transmission is activated at the time that the terminal transmits HARQ feedback for the retransmitted packet.

For example, if a new packet is received through temporary resources (730) in the second Rx-on period associated with the uplink feedback transmission, the terminal operates in the third Rx-on state. The expression 'operating in the third Rx-on state' as used herein means that the terminal operates in the Rx-on state until the time 735 that the processing on all the packets received through the temporary resources is completed. If the third Rx-on period expires, the terminal resumes the discontinuous reception operation through the first Rx-on period and the second Rx-on period. That is, the terminal turns on its receiver to receive a packet through persistent resources, transmit feedback information for the packet, and receive the packets retransmitted with regard to the feedback information.

Meanwhile, no persistent resource can be allocated to the terminal in the silent period. In this case, the first Rx-on period and the second Rx-on period associated with the persistent resource allocation interval may not overlap each other. In the silent period, since packets are transmitted every 160 msec, no packet may be received in the particular first Rx-on period 740. In this case, the terminal transitions to the Rx-off state, and then, waits until the next first Rx-on period. The second Rx-on period is not activated in the silent period where no persistent resources are allocated. On the other hand, if the persistent resources are allocated even in the silent period, the terminal activates the second Rx-on period every 160 msec which is a period for which packets are transmitted in the silent period.

Figure 8:
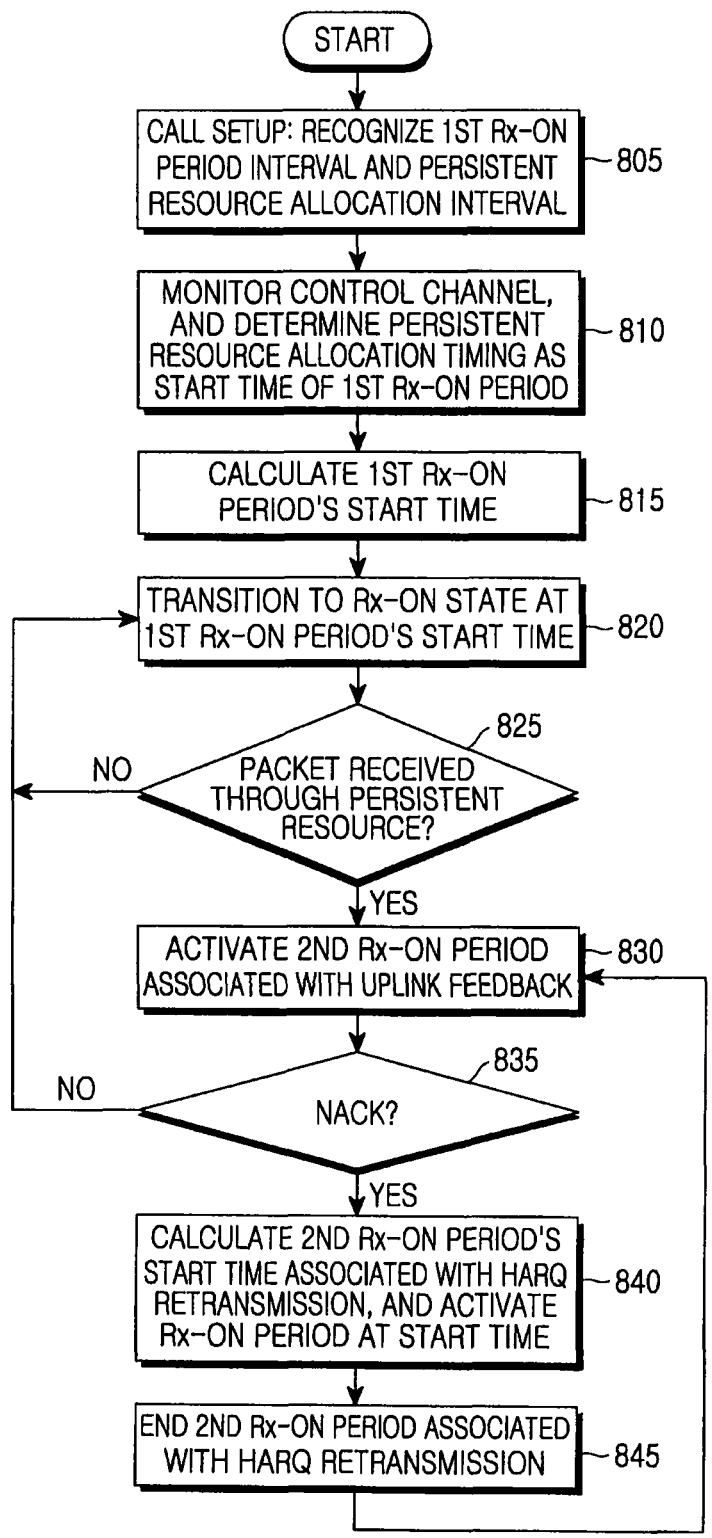
FIG. 8 is a diagram illustrating a terminal's discontinuous reception operation according to the first embodiment of the present invention.

FIG. 8 is a diagram illustrating an operation of a terminal supporting discontinuous reception according to the first embodiment of the present invention. The terminal is characterized herein that it operates in a discontinuous reception mode and receives packets through persistent resources.

Referring to FIG. 8, in step 805, the terminal performs a call setup process with a base station. The base station checks if the call being set up to the terminal is a call corresponding to the service where packets are generated at regular intervals, like the VoIP service. If this condition is satisfied, the base station according to the present invention allocates the first Rx-on period for applying the talk spurt period and silent period to the terminal. In addition, the base station notifies the persistent resource allocation intervals separately for the talk spurt period and the silent period.

After the call setup is completed, the terminal monitors allocation of the persistent resources through a control channel in step 810. Upon detecting the allocation of the persistent resources, the terminal performs the discontinuous reception operation with the first Rx-on period beginning from the persistent resource allocation timing. The first Rx-on period exists not only in the talk spurt period where persistent resources are allocated, but also in the silent period where persistent resources are released.

In step 815, the terminal calculates a start time of the first Rx-on periods using the first start time of the first Rx-on period and the first Rx-on period interval in accordance with Equation (1).

$$\text{first Rx-on period's start time=first start time of first Rx-on period}+n*\text{first Rx-on period interval} \quad (1)$$

where n is an integer greater than or equal to 0.

In step 820, the terminal keeps its Rx-off state until the nearest first Rx-on period's start time, and transitions to the Rx-on state at the first Rx-on period's start time.

In step 825, the terminal checks if a packet is received through persistent resources in the first Rx-on period. Upon detecting receipt of no packet in step 825, the terminal returns to step 820. Thereafter, the terminal waits until the next first Rx-on period, and then, transitions to the Rx-on state at the next first Rx-on period's start time. The reason why no packet is received through the persistent resources in the first Rx-on period is because, for example, as the silent period starts, the persistent resources allocated to the terminal are released.

If a packet is received through the persistent resources, the terminal performs the discontinuous reception operation with the second Rx-on period. In step 830, the terminal processes the packet, and checks the presence of an error through CRC calculation. Further, the terminal adds a time d1 to the packet reception time to check the TTI where it will transmit the uplink feedback information. The terminal herein recognizes the downlink TTI not overlapping the TTI as a second Rx-on period associated with the uplink feedback. The terminal turns on its transmitter during the second Rx-on period associated with the uplink feedback to transmit the feedback information over the uplink, and turns on its receiver to monitor a control channel on the downlink.

The expression 'the terminal transmits ACK' as used herein mans that the packet reception is normally completed through persistent resources in the TTI. Therefore, the terminal returns to step 820, and waits until the next first Rx-on period's start time.

On the contrary, the expression 'the terminal transmits NACK' as used herein means that HARQ retransmission will be performed on the error packet through the persistent resources, and the terminal proceeds to step 840. In step 840, the terminal calculates a start point of the second Rx-on period associated with the HARQ retransmission by adding a predetermined time d2 to the time the transmission of feedback information was completed. Further, the terminal activates the Rx-on period at the start point of the second Rx-on period associated with the HARQ retransmission. In step 845, upon receipt of the retransmitted HARQ packet, the terminal ends the second Rx-on period associated with the HARQ retransmission.

Thereafter, the terminal returns to step 830, and repeats the process until the reception of the packet received through persistent resources is normally completed. If the receipt of the packet is completed, the terminal proceeds to step 820, waits until the next first Rx-on period's start point, and then activates the first Rx-on period in the first Rx-on period's start point. Herein, as the first Rx-on period's start point is set to be equal to the second Rx-on period's start point associated with the persistent resource allocation, the terminal actually transitions to the Rx-on state in the second Rx-on period, and receives the packet transmitted through the persistent resources.

Although not illustrated in FIG. 8, if no uplink persistent resources are allocated to the terminal, the terminal distinguishes the second Rx-on periods associated with the uplink persistent resources, and monitors the downlink control channel in the second Rx-on periods associated with the uplink persistent resources.

As described above, the second Rx-on periods associated with the uplink persistent resources include a 'second Rx-on period associated with the uplink persistent resource allocation interval' and a 'second Rx-on period associated with the downlink feedback reception'.

Figure 9:
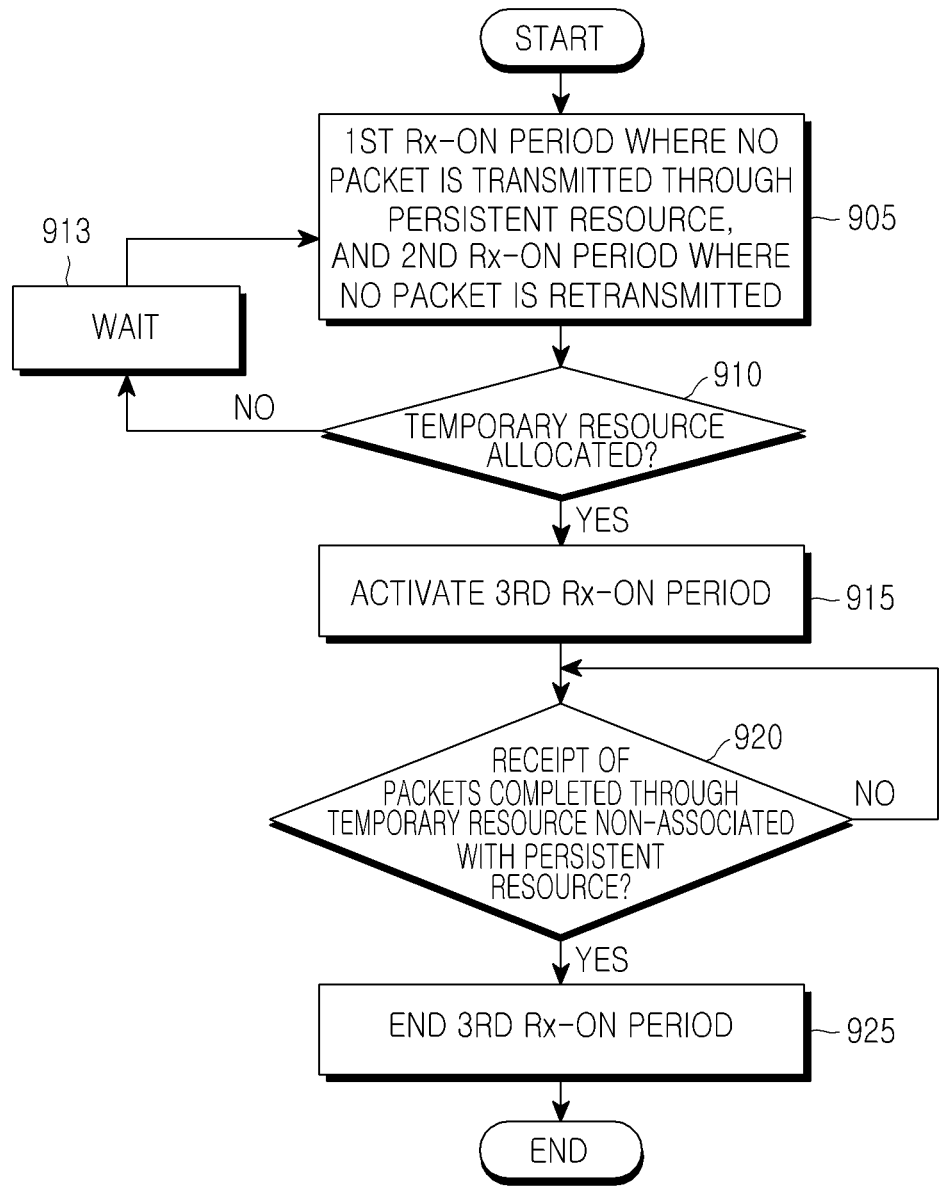
FIG. 9 is a diagram illustrating a discontinuous reception operation of a terminal with respect to the temporary resources according to the first embodiment of the present invention.

FIG. 9 is a diagram illustrating a discontinuous reception operation of a terminal with respect to the temporary resources according to the first embodiment of the present invention.

Since it is not possible to allocate temporary resources in the period where packets are transmitted through the persistent resources, the third Rx-on period starts at the first Rx-on period where no packets are transmitted through the persistent resources, or at the second Rx-on period where no packet is retransmitted. The first Rx-on period where no packet is transmitted through the persistent resources is defined herein as a first Rx-on period in the silent period where no persistent resources are allocated. In addition, the second Rx-on periods where no packet is retransmitted include the remaining periods except for the TTIs where packets are retransmitted, in the second Rx-on period associated with the uplink feedback or the second Rx-on period associated with the HARQ retransmission.

Referring to FIG. 9, in step 905, the terminal monitors a control channel at the first Rx-on period where no packet is transmitted through the persistent resources, or at the second Rx-on period where no packet is retransmitted. In step 910, the terminal checks if temporary resources are allocated in the above period.

Upon detecting the non allocation of the temporary resources in step 910, the terminal proceeds to step 913. In step 913, the terminal keeps its waiting state until there is a first Rx-on period where no packet is transmitted through persistent resources, or there is a second Rx-on period where no packet is retransmitted.

Upon detecting the allocation of the temporary resources, the terminal proceeds to step 915 where it activates the third Rx-on period. In other words, the terminal turns on its receiver and monitors a control channel.

In step 920, the terminal receives packets through the temporary resources during the third Rx-on period. The third Rx-on period is kept until the temporary resources are closed. The time that the packet reception is completed is herein the time the terminal transmitted HARQ ACK for the received packet, or the time the terminal transmitted the final HARQ NACK as there is an error even though it has received retransmissions as many times as the predetermined number. If the terminal completes the packet reception through temporary resources for the third Rx-on period, the terminal proceeds to step 925 where it ends the third Rx-on period.

Figure 10:
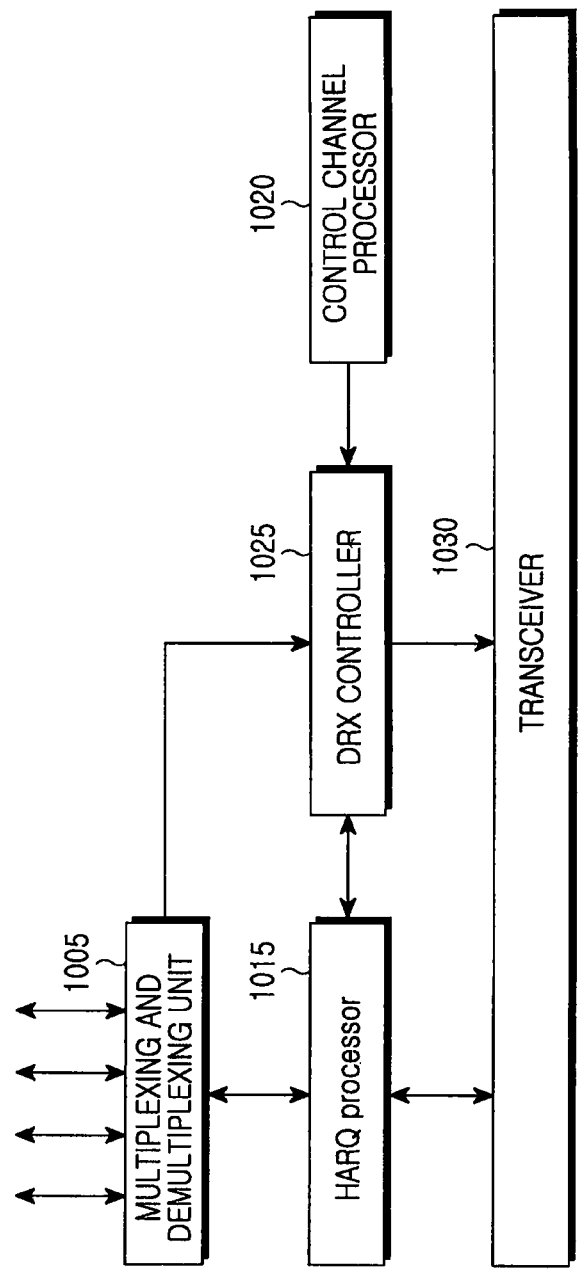
FIG. 10 is a diagram illustrating a structure of a terminal for performing a discontinuous reception operation according to an embodiment of the present invention.

FIG. 10 is a diagram illustrating a structure of a terminal for performing a discontinuous reception operation according to an embodiment of the present invention.

Referring to FIG. 10, a terminal includes a multiplexing and demultiplexing unit 1005, a Hybrid Automatic Repeat reQuest (HARQ) processor unit 1015, a transceiver 1030, a Discontinuous Reception (DRX) controller 1025, and a control channel processor 1020.

The multiplexing and demultiplexing unit 1005 performs an operation of multiplexing the packets generated by the upper layer into one HARQ packet and delivering it to the HARQ processor unit 1015, or demultiplexing an HARQ packet provided by the HARQ processor unit 1015 and delivering the demultiplexed packets to the upper layer.

The HARQ processor unit 1015 processes the HARQ packet that a reception unit (receiver) of the transceiver 1030 receives through an HARQ operation, and delivers the error-free HARQ packet to the demultiplexing unit 1005. Further, the HARQ processor unit 1015 transmits the packet delivered by the multiplexing unit by means of a transmission unit (transmitter) of the transceiver 1030 through a predetermined HARQ operation. The HARQ processor unit 1015 can be composed of several HARQ processors. Each HARQ processor is a set of entities that receives an HARQ packet and transmits HARQ ACK/NACK information for the received packet, i.e., performs a retransmission operation on the error-generated HARQ packet.

The control channel processor 1020 checks a control channel received via the transceiver 1030 to determine the reception/non-reception of not only the packet corresponding to a particular service, but also the packet data for another service. Based on the check result of the control channel processor 1020, the DRX controller 1025 controls an on/off-operation of the transceiver 1030.

The DRX controller 1025 analyzes a signal received through a control channel, and calculates a first Rx-on period's start point using the first Rx-on period set according to the packet transmission period. The DRX controller 1025 turns on the receiver of the transceiver 1030 every first Rx-on period so that the control channel is received. Further, the DRX controller 1025 determines the time the persistent resources are allocated, calculates second Rx-on periods with regard to the persistent resource allocation timing and the persistent resources, and turns on the receiver of the transceiver 1030 every second Rx-on period to receive packets through the persistent resources. In addition, the DRX controller 1025 can receive HARQ retransmission packets, and transmit feedback information with respect to the HARQ retransmission. When transmitting feedback information associated with the HARQ retransmission, the DRX controller 1025 can receive the downlink control channel. Further, the DRX controller 1025 activates the third Rx-on period, monitors the state of the HARQ processor unit 1015 to determine the end time of the third Rx-on period, and receives the packet through temporary resources.

The transceiver 1030, under the control of the DRX controller 1025, operates in the Rx-on or Rx-off state to receive a control channel, receive a packet through persistent resources, or receive an irrelevant packet different from the packet through the temporary resources. In addition, the transceiver 1030 transmits retransmission packets associated with the retransmission of the packets, and uplink feedback information for requesting retransmission packets. That is, the transceiver 1030, under the control of the DRX controller 1025, operates in the Rx-off state in the Rx-off period and operates in the Rx-on state in the Rx-on period. Although the transceiver 1030 is herein composed of one device, it can be divided into a transmission unit and a reception unit.

Figure 11:
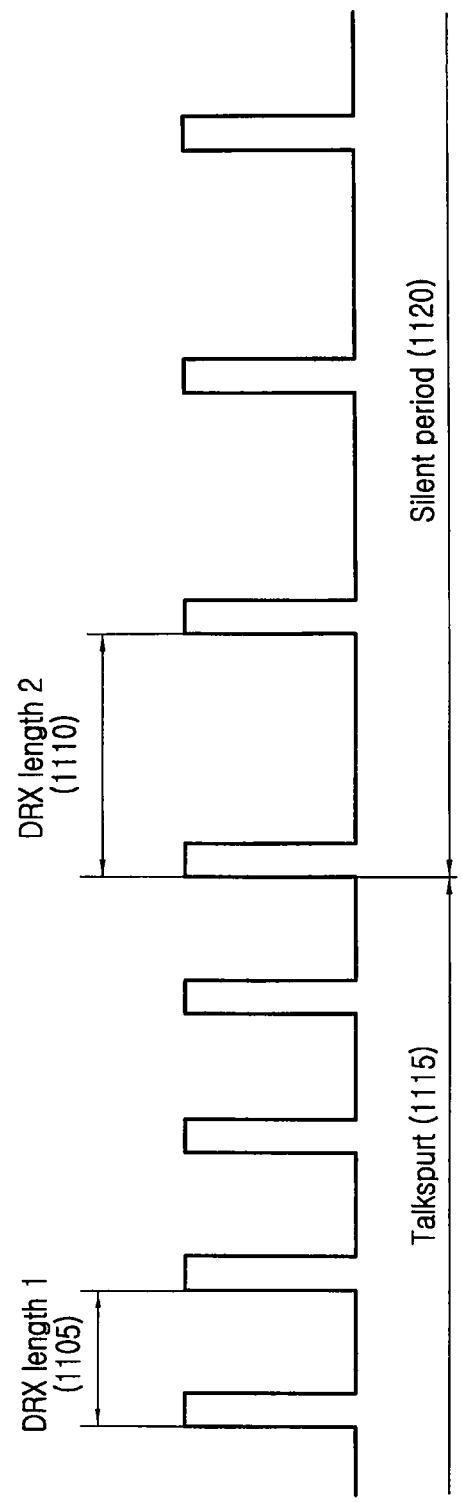
FIG. 11 is a diagram for a description of a discontinuous reception operation according to a second embodiment of the present invention.

FIG. 11 is a diagram for a description of a discontinuous reception operation according to a second embodiment of the present invention.

In a talk spurt period for VoIP communication, packets are generated every 20 msec, and in silent period, packets are generated every 160 msec. Therefore, it is preferable to apply a longer Rx-on period to the silent period compared with the talk spurt period, instead of applying the same-length Rx-on period to both the talk spurt period and the silent period.

Figure 12:
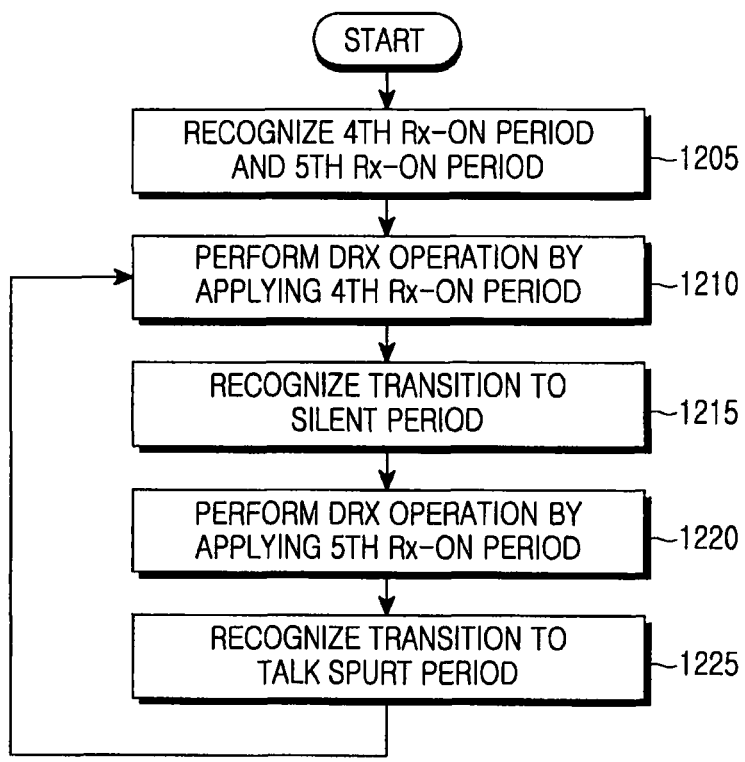
FIG. 12 is a diagram illustrating a terminal's operation according to the second embodiment of the present invention.

FIG. 12 illustrates a terminal's operation according to the second embodiment of the present invention.

Referring to FIG. 12, in step 1205, the terminal receives a length of a fourth Rx-on period and a length of a fifth Rx-on period, signaled from a base station in a call setup process. The fourth Rx-on period is a shorter-length Rx-on period applied to the talk spurt period, and the fifth Rx-on period is a longer-length Rx-on period applied to the silent period. The base station sets the above parameters so as to provide a proper DRX efficiency while satisfying the service quality such as the allowed delay of VoIP communication.

Since the VoIP communication has an attribute that it always starts at the talk spurt period and repeats the silent period and the talk spurt period, when the call setup process is completed, the terminal performs in step 1210 the DRX operation by first applying the fourth Rx-on period. In the talk spurt period, VoIP packets can be transmitted/received using the persistent resources, and the base station sets the DRX structure so that the time where persistent resources are available becomes the fourth Rx-on period, and then, allocates persistent resources to the terminal. The terminal turns on its receiver in the subframe corresponding to the fourth Rx-on period, and if persistent resources are allocated in the fourth Rx-on period, the terminal receives downlink data through the allocated persistent resources. If no persistent resource is allocated in the fourth Rx-on period, the terminal monitors L1/L2 control channels to monitor whether general resources are allocated. In the fourth Rx-on period where no persistent resource is allocated, retransmission associated with persistent resources can be performed, or transmission of packets other than VoIP packets can be performed.

The terminal, while performing the DRX operation to which the fourth Rx-on period is applied, monitors the presence/absence of a transition from the talk spurt period to the silent period. Upon detecting a transition from the talk spurt period to the silent period in step 1215, the terminal proceeds to step 1220 where it performs a DRX operation to which the fifth Rx-on period is applied.

The terminal can detect the transition from the talk spurt period to the silent period through the following three methods.

Talk Spurt Period to Silent Period Transition Detection Method 1

If the terminal has never successfully decoded a packet through persistent resources during n preceding Rx-on periods, or during m preceding subframes, the terminal determines that it has made a transition to the silent period. For the n and m, signaled values can be used, or predetermined values can be used.

It is general that the terminal transmits/receives data using persistent resources in the talk spurt period, and transmits/receives data using general resources in the silent period. Therefore, failing to receive data through persistent resources for a predetermined period means that the persistent resources allocated for the talk spurt period were released and the silent period is started after the talk spurt period expires. Therefore, the terminal can determine that it has made a transition to the silent period.

Talk Spurt Period to Silent Period Transition Detection Method 2

If the persistent resources allocated for the talk spurt period are released, the terminal determines that it has made a transition to the silent period. The allocation and release of the persistent resources can signaled to the terminal through an explicit control signal, or by a predetermined implicit method. The expression 'persistent resources allocated for the talk spurt period' refers to the persistent resources through which the terminal was receiving downlink VoIP packets.

Talk Spurt Period to Silent Period Transition Detection Method 3

If the terminal has never successfully decoded a packet through persistent resources during n preceding Rx-on periods, or during m preceding subframes, and the retransmission on the data transmitted through the persistent resources has never been scheduled through L1/L2 control channels, the terminal determines that it has made a transition to the silent period. For the n and m, signaled values can be used, or predetermined values can be used.

The persistent resources are used only for the initial transmission, and the retransmission is performed through general resources. Since the base station does not transmit data through persistent resources after the terminal made a transition to the silent period, the retransmission on the data which the terminal determines were transmitted through persistent resources is also not performed. Therefore, whether the retransmission on the persistent resources is performed or not can be used as a criterion for determining the transition to the silent period.

Upon detecting its transition from the talk spurt period to the silent period using one of the above methods, the terminal performs the DRX operation to which the fifth Rx-on period is applied in step 1220. That is, the terminal calculates the start point of the fifth Rx-on period using the fifth Rx-on period, and turns on the receiver at the start point of the calculated fifth Rx-on period to monitor L1/L2 control channels for a predetermined period. After a lapse of a predetermined period, the terminal turns off its receiver and waits until the start point of the next Rx-on period, repeating the same operation.

In addition, the terminal, while performing the DRX operation to which the fifth Rx-on period is applied, monitors its transition from the silent period to the talk spurt period.

The terminal can detect its transition from the silent period to the talk spurt period through the following two methods.

Silent Period to Talk Spurt Period Transition Detection Method 1

If the terminal has successfully processed more than two packets during p preceding Rx-on periods, or during q preceding subframes, the terminal determines that it has made a transition to the talk spurt period.

As described above, one packet is generated every 160 msec in the silent period. In other words, if the terminal has successfully processed more than two packets during a period shorter than 160 msec, the terminal can determine that a transition to the talk spurt period has happened. For the p and q, they can be signaled in the call setup process, or predetermined values can be used.

Silent Period to Talk Spurt Period Transition Detection Method 2

If persistent resources are allocated for the talk spurt period, the terminal determines that it has made a transition to the talk spurt period.

If persistent resources are explicitly allocated through L1/L2 channels, the terminal recognizes the allocation of the persistent resources, and can determine the transition to the talk spurt period from the allocation of the persistent resources.

In step 1225, upon detecting the transition from the silent period to the talk spurt period using one of the above stated methods, the terminal returns to step 1210 where it performs the DRX operation to which the fourth Rx-on period is applied.

Next, a description will be made of a DRX operation more efficient in the talk spurt period according to a third embodiment of the present invention.

Figure 13:
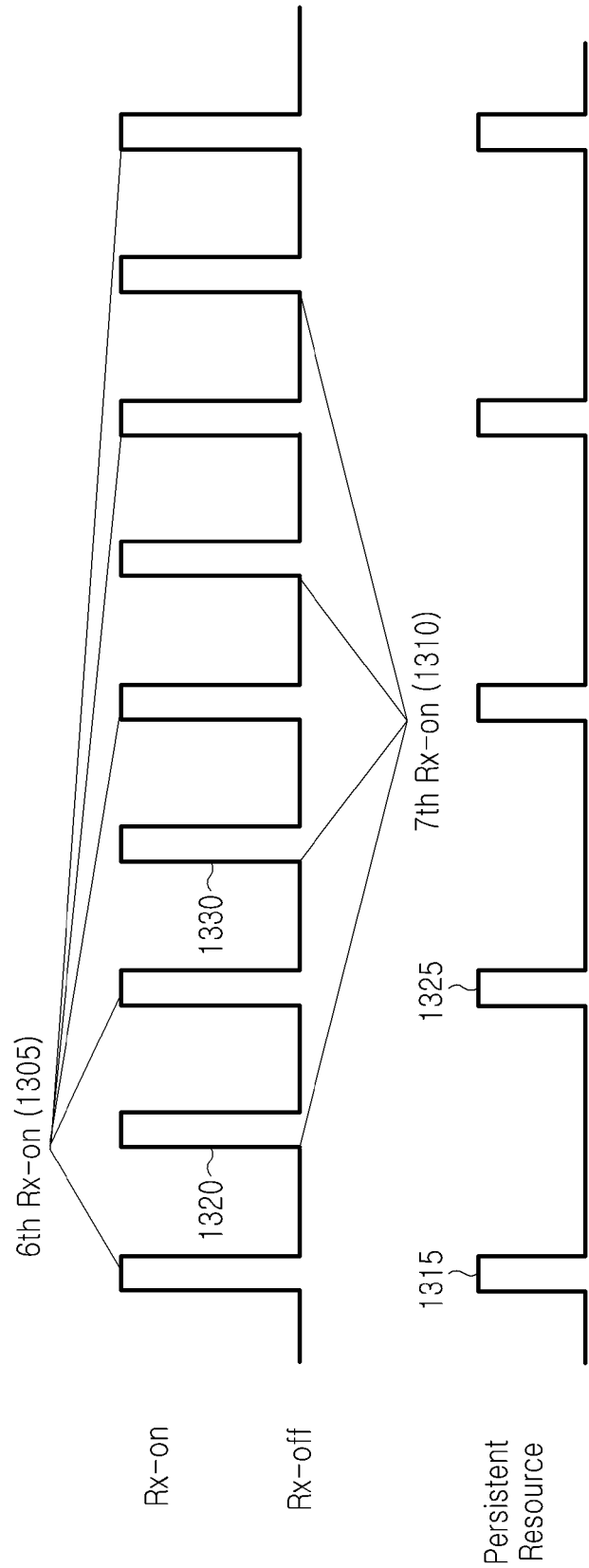
FIG. 13 is a diagram for a description of a DRX operation according to a third embodiment of the present invention.

FIG. 13 is a diagram for a description of a DRX operation according to a third embodiment of the present invention.

Referring to FIG. 13, in the third embodiment of the present invention, Rx-on periods are divided into Rx-on periods 1305 associated with persistent resources, and Rx-on period Rx-on 1310 non-associated with persistent resources. The Rx-on period 1305 associated with persistent resources is an Rx-on period including the time the persistent resources are allocated, and in the Rx-on period 1305 associated with persistent resources, packets are always transmitted and received through the persistent resources. For convenience' sake, the Rx-on period 1305 associated with persistent resources will be referred to herein as a 'sixth Rx-on period'.

The Rx-on period 1310 non-associated with persistent resources means all Rx-on periods other than the Rx-on periods associated with persistent resource among the Rx-on periods, and in the Rx-on period non-associated with persistent resources, retransmission on the packets transmitted/received through persistent resources is performed. For convenience's sake, the Rx-on period 1310 non-associated with persistent resources will be referred to herein as a 'seventh Rx-on period'.

Since data is always transmitted and received through the sixth Rx-on period, the terminal always turns on its receiver in the sixth Rx-on period. However, in the seventh Rx-on period, the terminal turns on the receiver only when there is a need for retransmission on the packets transmitted/received through persistent resources. In other words, the terminal activates a succeeding seventh Rx-on period 1320 only when there is a need for retransmission on the packet as it has failed in decoding of the packet received through certain persistent resources 1315. When the terminal has succeeded in decoding of the packet received through other persistent resources 1325, a succeeding seventh Rx-on period 1330 is inactivated.

Figure 14:
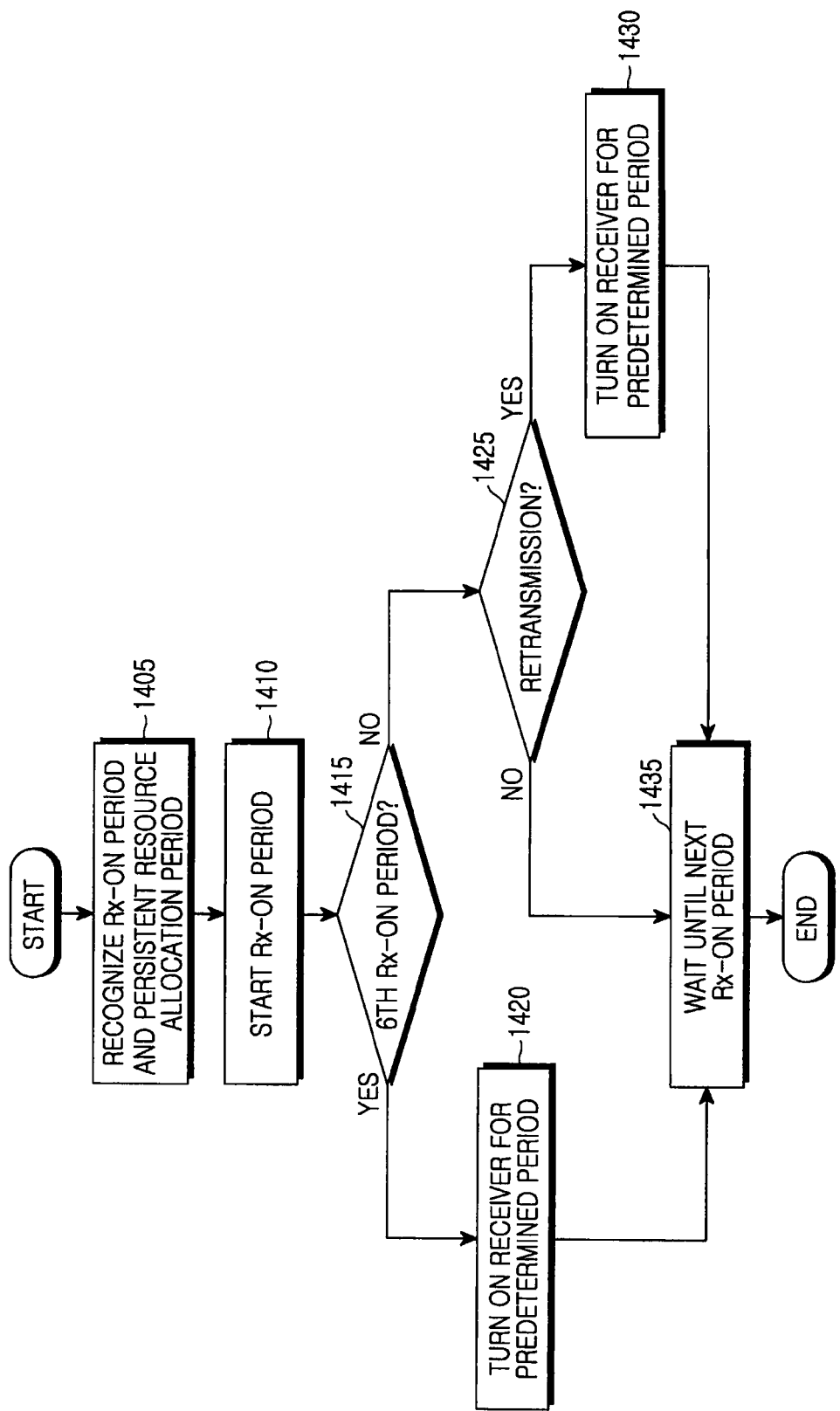
FIG. 14 is a diagram illustrating a terminal's DRX operation according to the third embodiment of the present invention.

FIG. 14 illustrates a terminal's operation according to the third embodiment of the present invention.

Referring to FIG. 14, in step 1405, the terminal acquires information such as Rx-on period and persistent resource allocation period from a base station in a call setup process. The Rx-on period is an Rx-on period to which a talk spurt period of the terminal is applied, and the Rx-on period to be applied to the silent period can be separately signaled.

The terminal recognizes a start time of the Rx-on period using the Rx-on period and a first start time of the Rx-on period recognized by a predetermined method.

If a start time of the Rx-on period arrives in step 1410, the terminal checks in step 1415 if the Rx-on period is a sixth Rx-on period or a seventh Rx-on period.

An Rx-on period including persistent resource allocation timing is the sixth Rx-on period, and an Rx-on period not including persistent resource allocation timing is the seventh Rx-on period. The terminal proceeds to step 1420 for the sixth Rx-on period, and step 1425 for the seventh Rx-on period.

In step 1420, the terminal activates the sixth Rx-on period. In other words, the terminal turns on its receiver for a period corresponding to the sixth Rx-on period to receive packets through persistent resources, and monitors L1/L2 control channels. When the sixth Rx-on period expires, the terminal proceeds to step 1435 where it turns off its receiver and waits until the next Rx-on period.

In step 1425, the terminal checks whether to perform retransmission through the seventh Rx-on period. If there is any packet still undergoing an HARQ retransmission operation among the packets previously received through persistent resources, it can be expected that HARQ retransmission on the packet will happen through the seventh Rx-on period. On the contrary, if there is no packet still undergoing an HARQ retransmission operation among the packets previously received through persistent resources, it can be expected that HARQ retransmission will not happen through the seventh Rx-on period. If the terminal determines that retransmission will be performed through the seventh Rx-on period, it proceeds to step 1430, and otherwise, proceeds to step 1435.

In step 1430, the terminal activates the seventh Rx-on period. In other words, the terminal turns on its receiver for a period corresponding to the seventh Rx-on period, and monitors L1/L2 control channels. If retransmission is scheduled through the L1/L2 control channels, the terminal receives the retransmission packet and processes it by a predetermined method. When the seventh Rx-on period expires, the terminal proceeds to step 1435 where it turns off its receiver and waits until the next Rx-on period.

If it is determined in step 1425 that no retransmission has been performed, the terminal proceeds to step 1435 without activating the seventh Rx-on period, i.e., without turning on its receiver, and waits until the next Rx-on period with the receiver turned off.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for performing discontinuous reception by a user equipment (UE) in a mobile communication system, the method comprising:
   monitoring a downlink control channel during a predetermined period for the discontinuous reception to check whether the UE is scheduled;
   if an initial packet is received during a first period recurring at a fixed interval allocated according to a persistent resource, checking whether there is a reception error of the initial packet or not;
   if there is a reception error of the initial packet, monitoring a reception of the initial packet re-transmitted during a second period,
   wherein the first period and the second period are included in the predetermined period,
   wherein the second period starts after a predetermined time interval from a subframe where feedback information of the initial packet is sent, and
   wherein the second period has a variable duration determined according/to a time of receiving the re-transmitted initial packet.

2. The method of claim 1, wherein the first period is set during a Transmission Time Interval (TTI) for which a persistent resource for the initial packet is allocated, and the second period is set during a TTI for which a persistent resource for the retransmission of the initial packet is allocated.

3. The method of claim 1, wherein the feedback information is transmitted to a scheduling device through uplink resources during a feedback information-related reception period between the first period and the second period.

4. The method of claim 3, further comprising:
   monitoring whether a downlink control channel is transmitted from the scheduling device, during the feedback information-related reception period.

5. The method of claim 4, further comprising:
   checking through the downlink control channel whether temporary resources that are different from persistent resources are allocated; and
   receiving a packet through the temporary resources during a third period being set according to the temporary resources,
   wherein the temporary resources are used to receive temporarily generated packets.

6. A user equipment (UE) for performing discontinuous reception in a mobile communication system, the UE comprising:
   a controller configured to monitor a downlink control channel during a predetermined period for the discontinuous reception to check whether the UE is scheduled, if an initial packet is received during a first period recurring at a fixed interval allocated according to a persistent resource, check whether there is a reception error of the initial packet or not, and if there is the reception error of the initial packet, monitor a reception of the initial packet re-transmitted during a second period; and a transceiver configured to receive the initial packet and the re-transmitted initial packet, wherein the first period and the second period are included in the predetermined period, wherein the second period starts after a predetermined time interval from a subframe where feedback information of the initial packet is sent, and wherein the second period has a variable duration determined according to a time of receiving the re-transmitted initial packet.

7. The UE of claim 6, wherein the controller sets the first period during a Transmission Time Interval (TTI) for which a persistent resource for the initial packet is allocated, and sets the second period during a TTI for which a persistent resource for the retransmission of the initial packet is allocated.

8. The UE of claim 6, wherein the feedback information is transmitted to a scheduling device through uplink resources during a feedback information-related reception period between the first period and the second period, under a control of the controller.

9. The UE of claim 8, wherein the transceiver receives a downlink control channel from the scheduling device during the feedback information-related reception period.

10. The UE of claim 9, further comprising:

a control channel processor for checking the downlink control channel to determine whether temporary resources are allocated that are different from persistent resources, and delivering the allocation/non-allocation of the temporary resources to controller, wherein the temporary resources are used to receive temporarily generated packets.

11. The UE of claim 10, wherein the transceiver receives a packet through the temporary resources during a third period that is set according to the temporary resources, under the control of the controller.

12. A method for performing discontinuous reception by a user equipment (UE) in a mobile communication system, the method comprising:

monitoring, by a controller, a downlink control channel during a predetermined period for the discontinuous reception and checking whether the UE is scheduled based on a monitoring report, wherein the predetermined period includes a first period and a second period, and wherein the first period recurs at a fixed interval according to a persistent resource allocation, and the second period occurs if the initial packet received at the first period is not successfully decoded, the second period starts after a predetermined time interval from a subframe where feedback information of the initial packet is sent, and the second period has a variable duration determined according to a time of receiving a re-transmitted initial packet.

* * * * *